(12) United States Patent
Nijim et al.

(10) Patent No.: US 9,578,116 B1
(45) Date of Patent: *Feb. 21, 2017

(54) REPRESENTING VIDEO CLIENT IN SOCIAL MEDIA

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US)

(73) Assignee: COX COMMUNICATIONS, Atlanta, GA (US)

( * ) Notice: Subject to any disclaimer, the term of this patent is extended or adjusted under 35 U.S.C. 154(b) by 222 days.

This patent is subject to a terminal disclaimer.

(21) Appl. No.: 14/455,567

(22) Filed: Aug. 8, 2014

(51) Int. Cl.
*G06F 15/16* (2006.01)
*H04L 29/08* (2006.01)
*H04L 12/58* (2006.01)
*H04N 21/25* (2011.01)

(52) U.S. Cl.
CPC ............. *H04L 67/16* (2013.01); *H04L 51/32* (2013.01); *H04L 67/02* (2013.01); *H04N 21/251* (2013.01)

(58) Field of Classification Search
CPC .......... H04L 67/16; H04L 67/02; H04L 51/32; H04N 21/251
USPC ................................ 709/203, 204, 206, 219
See application file for complete search history.

(56) References Cited

U.S. PATENT DOCUMENTS

| 6,637,029 | B1 | 10/2003 | Maissel et al. |
| 6,757,691 | B1 | 6/2004 | Welsh et al. |
| 9,277,257 | B1 | 3/2016 | Nijim et al. |
| 2001/0001160 | A1* | 5/2001 | Shoff ................. H04N 5/44543 725/51 |
| 2007/0234213 | A1* | 10/2007 | Krikorian ........ H04N 21/23406 715/716 |
| 2009/0271820 | A1 | 10/2009 | Choi et al. |
| 2011/0184899 | A1 | 7/2011 | Gadanho et al. |
| 2011/0289139 | A1 | 11/2011 | McIntosh et al. |
| 2012/0173625 | A1 | 7/2012 | Berger |
| 2013/0018957 | A1* | 1/2013 | Parnaby ................. G06Q 10/10 709/204 |
| 2013/0215116 | A1* | 8/2013 | Siddique ............ G06Q 30/0643 345/420 |
| 2013/0238588 | A1 | 9/2013 | Annau et al. |
| 2013/0263185 | A1 | 10/2013 | Wood et al. |
| 2013/0305280 | A1 | 11/2013 | Fleischman |
| 2014/0006977 | A1* | 1/2014 | Adams .................... H04L 51/32 715/758 |

(Continued)

Primary Examiner — Thu Ha Nguyen
(74) Attorney, Agent, or Firm — Merchant & Gould

(57) ABSTRACT

Video client social media account creation and linking of the video client social media account creation to a video services subscription account is provided. A user may create a video client social media account in one of various social media services, wherein the video client social media account is linked to the user's video service subscriber account. The user and the user's social media contacts may follow and/or be followed by the video client social media account. Information associated with video content may be electronically communicated with the video client social media account. A search for available or upcoming video content matching the received information may be performed, and one or more functionalities may be automatically performed when the content is available.

20 Claims, 7 Drawing Sheets

(56) References Cited

U.S. PATENT DOCUMENTS

| | | | |
|---|---|---|---|
| 2014/0033075 A1 | 1/2014 | Lansford et al. | |
| 2014/0047074 A1* | 2/2014 | Chung | H04L 67/32 |
| | | | 709/219 |
| 2014/0067828 A1 | 3/2014 | Archibong et al. | |
| 2014/0067998 A1 | 3/2014 | Garcia et al. | |
| 2014/0074629 A1* | 3/2014 | Rathod | G06Q 10/10 |
| | | | 705/14.73 |
| 2014/0156791 A1* | 6/2014 | Sant | G06F 17/30058 |
| | | | 709/217 |
| 2014/0201678 A1* | 7/2014 | Shen | G06F 3/0481 |
| | | | 715/788 |
| 2014/0229544 A1* | 8/2014 | Evans | G06Q 50/01 |
| | | | 709/204 |
| 2014/0351354 A1* | 11/2014 | Chandra | H04L 51/046 |
| | | | 709/206 |
| 2014/0359647 A1 | 12/2014 | Shoemake et al. | |
| 2015/0016661 A1* | 1/2015 | Lord | H04N 21/42203 |
| | | | 382/100 |
| 2015/0332062 A1* | 11/2015 | McReynolds | H04L 51/28 |
| | | | 726/28 |
| 2016/0012133 A1* | 1/2016 | Shim | G06Q 10/10 |
| | | | 707/741 |
| 2016/0012465 A1* | 1/2016 | Sharp | G06Q 20/18 |
| | | | 705/14.17 |
| 2016/0149956 A1* | 5/2016 | Birnbaum | H04L 63/101 |
| | | | 726/1 |

* cited by examiner

REPRESENTING VIDEO CLIENT IN SOCIAL MEDIA

BACKGROUND

Video content users today can oftentimes be overwhelmed by the vast amount of video content that is available to them to watch. While there are tools available in a viewing experience that help users to find specific video content items that they want to watch (e.g., programming guide, search functions, recommendations, etc.), there are many times when a user is not at his/her television and may see or hear about a video content item that he/she is interested in viewing. The video content item may or may not be currently available or soon-to-be available for viewing. If the video content item is not currently available for viewing, the user may have to remember when the video content item will be available or periodically check to see if the content item is available.

For example, a video services user may hear about a show via social media that he/she is interested in watching, or see a movie poster at a theater for a movie that the user would like to see when it becomes available to watch through his/her video services subscription (e.g., cable or satellite service provider). If the date of availability is known, the user may have to remember the date, and if the date of availability is not known, the user may have to look up when the movie will be available via his/her service subscription. As can be appreciated, this can be burdensome to the user.

Users want to be able to find content they want to watch easily rather than searching for it when it becomes available. Additionally, video content users are increasingly finding that their televisions or other video viewing devices are becoming companions to them. For example, personalization of content, recommendations, and targeted advertising is becoming a norm in users' video viewing experiences. It is with respect to these and other considerations that the present invention has been made.

BRIEF SUMMARY

The above and other problems are solved by providing video client social media account creation and linking of the video client social media account creation to a video services subscription account. A user may create a video client social media account in one of various social media services, wherein the video client social media account is linked to the user's video service subscriber account. The user and the user's social media contacts may follow and/or be followed by the video client social media account. Information associated with video content may be electronically communicated with the video client social media account. A search for available or upcoming video content matching the received information may be performed, and one or more functionalities may be automatically performed when the content is available.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention.

BRIEF DESCRIPTION OF DRAWINGS

Referring now to the drawings in which like reference numbers represent corresponding parts throughout.

DETAILED DESCRIPTION

Figure 1:
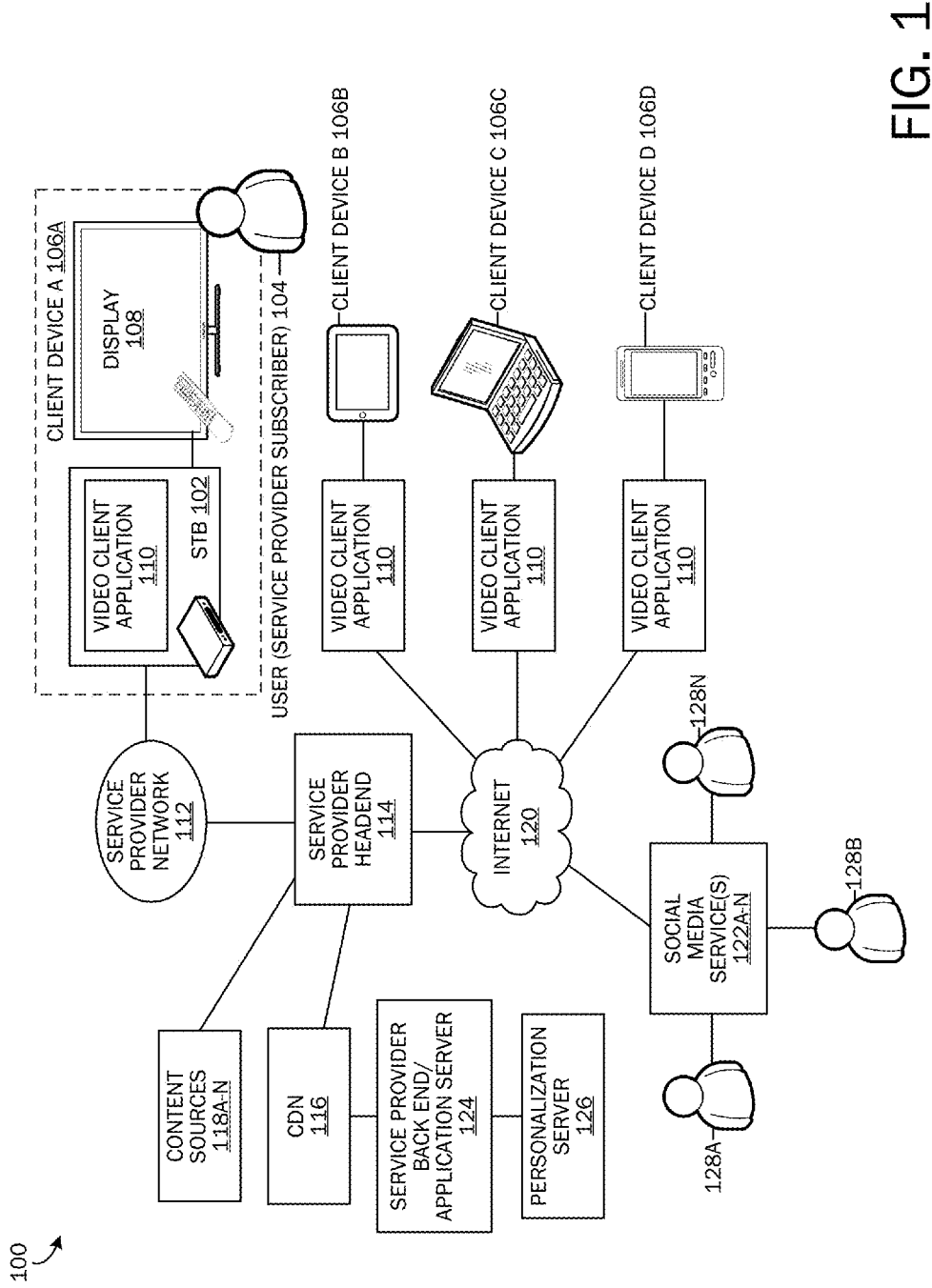
FIG. 1 is a simplified block diagram illustrating one embodiment of a system for providing video client social media account creation and linking of the video client social media account creation to a video services subscription account.

Embodiments provide for video client social media account creation and linking of the video client social media account creation to a video services subscription account. A user may create a video client social media account in one of various social media services, wherein the video client social media account is linked to the user's video service subscriber account. The video client social media account may be created through the social media service or a video service application user interface. The user and the user's social media contacts may follow and/or be followed by the video client social media account.

Information associated with video content may be communicated electronically with the video client social media account. For example, the user or a social media contact may follow or like a video content item via the video client social media account. Likewise, the user may search for a video content item via video client social media account, post an image, an audio, or a video clip of a video content item to the video client social media account, etc. As another example, the user may send a text, email, microblog, etc., including data associated with a video content item (e.g., title, key words, image, sound clip, other metadata video content metadata, etc.) to the video client social media account.

A search for available or upcoming video content matching the received information may be performed, and one or more functionalities (e.g., record the video content, send a reminder/notification, post a notification on the video client social media account profile page, place the video content in a folder, etc.) may be automatically performed when the content is available.

These embodiments may be combined, other embodiments may be utilized, and structural changes may be made without departing from the spirit or scope of the present invention. The following detailed description is therefore not to be taken in a limiting sense. Referring now to the drawings, in which like numerals refer to like elements throughout the several figures, embodiments of the present invention and an exemplary operating environment will be described.

FIG. 1 is a block diagram of one embodiment of a subscriber television system for providing representation of a video client in social media. Although embodiments are illustrated and described as a cable television system, in other embodiments, the subscriber television system may be one of various types of subscriber television systems, for example, a satellite-based television service provider system, an Internet protocol-based service provider system, or any other service provider system that is operable to provide audio, video, or a combination of audio and video content to users/subscribers for consumption via a variety of client devices 106A-D. A detailed illustration and description of an example cable television services provider system is provided below with reference to FIG. 7.

The illustrated system 100 includes a client device 106A-D (collectively 106), which may comprise one of various configurations of client devices. For example, client device 106A may be embodied as a converter, such as a set-top box 102, and a display 108 at a physical location associated with a cable system subscriber account. In various embodiments, the display 108 is part of a television set. A subscriber user 104 may create one or more user profiles corresponding to individuals associated with the subscriber account, or alternatively, one or more default user profiles may be automatically created and associated with the subscriber account. The set-top box 102 may be connected to a service provider network 112, such as a hybrid fiber-coax (HFC) network, and serves as a client that may comprise a video client application 110 or may be in communication with a remote video client application 110. The client device 106 may be embodied in various other configurations, for example, a tablet computing device 106B, a desktop, laptop, or hybrid computing device 106C, a mobile communication device 106D, a gaming device, an IP-enabled television, etc.

According to embodiments, the subscriber user 104 may be enabled to sign up for creation of a social media account or other electronic communication platform account representative of and linked to the user's video service subscriber account. One or more client devices 106 on which the user may access video content may be registered to the user's video service subscriber account. The one or more registered client devices 106 may be specified by IP address or by name for the particular device. Alternatively, the user's video service subscriber account may allow for access to video content on any client device 106 on which the video client application 110 is embedded, installed, or network-accessible.

The social media account or other electronic communication platform account representative of the user's video service subscriber account will herein be referred to as a video client social media account 210. The user may create multiple video client social media accounts 210 in various social media services 122A-N, wherein each of the user's one or more video client social media accounts 210 is linked to the user's video service subscriber account and may be accessible via the video client application 110 and the one or more social media services 122. The user 104, as well as the user's social media service contacts (herein referred to as "social media friends" 128A-N), may follow and/or be followed by the user's video client social media account 210. Video content followed by the video client social media account 210 or posted to a profile page of the video client social media account 210 may be "liked" by social media friends 128.

The video client application 110 may be operable to perform specific operations to receive social media or other electronic communications via the one or more social media services 122A-N and other electronic communication platform accounts, search for available or upcoming video content matching a received communication, and automatically perform functionalities (e.g., record the video content, send a reminder, place the video content in a folder, etc.) when the content is available. The video client application 110 may be further operable to perform other functionalities. For example, the video client application 110 may be operable to receive a sound clip or a video file, analyze the received file, recognize video content matching the received file, and record, send a reminder for, or place the matching video content in a folder.

The service provider network 112 may be connected with an Internet protocol (IP) network, such as the Internet 120. One or more social media services 122A-N (collectively 122) may be accessed by the set-top box 102 via the Internet 120 and the service provider network 112. The subscriber user 104 and friends 128A-N are not limited to using the set-top box 102 as a client 106 and may use any number of various clients 106A-D to associate with a video client social media account via a local or remote video client application 110, for example, mobile phones, computers, tablets, cable-ready, satellite-ready, or IP-enabled televisions, etc.

The video client social media account 210 may be stored in the service provider back end and application server 124, and the user's 104 video service subscription account and the video client social media account 210 may be linked. The user 104 may manage the video client social media account 210 from a user interface provided via the video client application 110 and/or through the one or more social media services 122A-N. One embodiment of an example video client application 110 user interface is described below with respect to FIG. 3.

A service provider content delivery network (CDN) 116 is illustrated in association with a service provider headend 114, and a service provider back end and application server 124 are illustrated in association with the service provider CDN 116. As should be appreciated, the layout of the functionalities of the service provider including the service provider CDN 116 and the service provider back end and application server system 124 are for purposes of illustration only and are not restrictive of the various layouts and combinations of systems that may be utilized by a given service provider for providing content to users/subscribers 104.

A service provider back end/application server 124 may provide functionality for maintaining profile information on the subscriber user 104 including permissions for the subscriber user 104 to utilize service provider functionality including consumption of service provider content and including such functionalities as content preferences, parental control systems, billing systems, and the like. The back end and application server 124 for the service provider may provide operating functionality, for example, one or more software applications and associated databases for directing content distribution provided by the service provider to users/subscribers 104 at client devices 106.

The service provider content delivery network (CDN) 116 is illustrative of a delivery or distribution network which may include a distributed system of servers, databases, and other content repositories for distributing audio and video content, text, graphics, media files, software applications and associated documents, on-demand content, social media content, live streaming media content, and the like from the service provider to users/subscribers 104. CDNs 116 typically function by receiving requests from clients 106, checking a local cache for a copy of the requested resource, or querying some source if a requested resource is not in the cache or has expired for example. CDN servers can be strategically located at the edges of various networks to limit loads on network interconnects and backbones. CDN servers can be redundantly deployed and interact with other CDN servers to respond to content requests from clients 106 in attempts to optimize content delivery. For example, network edge servers can enable ease of browsing, navigating and streaming of content, including streaming live video. For example, if a given user operating a tablet computing device 106B selects a news story for live streaming to the tablet computing device 106B as offered by the service provider, the application server at the back end application server 124 may cause a media player to activate for streaming the desired content from the service provider CDN 116 to the user's tablet computing device 106B via IP-based transmission to the tablet computing device 106B.

The service provider gathers content from a variety of content sources 118A-N (collectively 118) including network feeds, stored media, communication links, video on demand sources, Internet sources, and live studio sources. The service provider headend 114 converts the content into a form that can be managed and distributed, then stores, moves and sends out (playout) the media at scheduled times. The service provider network 112 simultaneously transfers multiple channels to subscribers/users 104 who are connected to the service provider system. Users 104 view video content on displays 108 (e.g., televisions) that are directly connected to a cable line (e.g., cable ready TVs) or through an adapter box (set top box 102). Video content may also be provided to clients 106 via use of IP networks (e.g., the Internet 120), which may be utilized to process and receive multimedia communications using IP protocol.

The system 100 may comprise a personalization server 126, which may be operable to receive and manage personalization information based on various controls, settings, and other criteria associated with the user's video services subscription account. For example, the personalization server 126 may be operable to gather information associated with searches made by the user 104 and the video content items liked and followed by the user 104 via the video client social media account, and analyze and correlate the information to understand where the user 104 is finding information about what he/she likes to watch and to understand the viewing preferences of the user 104. The information may further be utilized to feed to a recommendation engine to provide the user 104 with better recommendations and to provide the user 104 with targeted advertisements related to what the user 104 likes. An ad insertion system may be implemented to fill empty advertising slots or to replace existing advertising with ads that may be more personally tailored to the user according to user viewing data and/or the user's location.

According to embodiments, by adding the video client social media account as a follower of a social media account or by following the video client social media account, and upon receiving a post, email, or other electronic communication associated with a video content item or series of video content items, the video client application 110 may be enabled to send information to the user 104 and/or to social media friends 128 about the video content item(s) and/or to perform a functionality associated with the video content item(s).

Figure 2:
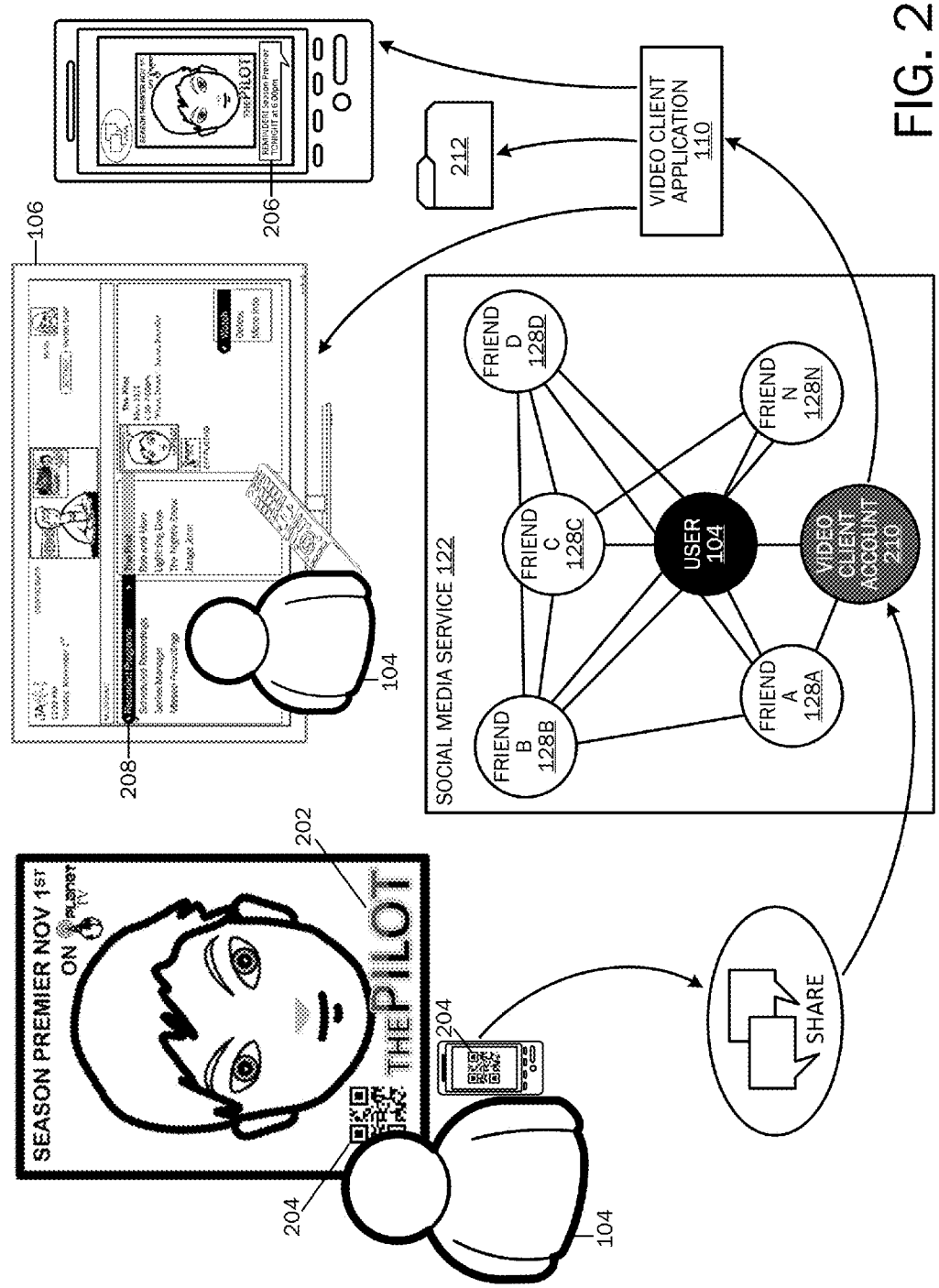
FIG. 2 illustrates an example of a user sharing information about a video content item with his/her video client account via social media.

For example and as illustrated in FIG. 2, the user 104 may create a video client social media account 210 associated with his/her video services subscription account. The user 104 may read about a movie or other video content item 202, and may show an interest in the video content item 202. For example, the user 104 may scan a matrix barcode 204 associated with the video content item 202, capture an image of the video content item 202, enter the title of the video content item 202, etc., and send the matrix barcode 204, captured image, or other information to the video client application 110 via posting, emailing, microblogging, or messaging the matrix barcode 204, captured image, or other information to his/her own social media account or to the video client social media account 210. The video client application 110 may identify and search for the movie (video content item 202); when it is available, the video client application 110 may place the video content item 202 in a folder 212 stored on a client device 106 or on the cloud, automatically record the video content item 202, send a reminder/notification 206 to the user 104 via one or more electronic communication methods, and/or place a reference to the availability of the video content item 202 on the user's social media account page.

As shown in the example illustrated in FIG. 2, a reminder/notification 206 is sent to the user's mobile communication device 106D, and the video content item 202 has been automatically recorded and saved in a recorded programs repository 208. Accordingly, the user 104 may be enabled to more easily find and access content. Additionally, the service provider may be enabled to better understand what the user 104 is interested in watching and where the user 104 is finding information about what he/she chooses to watch.

According to embodiments, the video client application 110 may correlate and connect other related information to video content items 202, for example, video content titles, key words, sound clips, images, and other recognizable and searchable metadata (e.g., actors, actresses, producer, theme, etc). For example, the user 104 may be listening to a song that he/she recognizes from a certain show or movie (video content item 202). The user 104 may capture an audio clip of the song and share (e.g., email, post, microblog, message, etc.) the clip or music file with the video client application 110 via the video client social media account 210. The clip or music file may be analyzed and matched with a video content item 202 title. The video content item 202 may be available via one or more content sources 118. Alternatively, the video content item 202 may not yet be available; however, when the video content item 202 becomes available, a reminder/notification 206 may be sent to the user 104 via one or more electronic communication methods as described above. If the video content item 202 is available, the video content item 202 may be placed in a folder 212 stored on a client device 106 or on the cloud, or automatically recorded. A notification may be communicated to the user 104 via one or more electronic communication methods (e.g., email, message, post, microblog, etc.).

Figure 3:
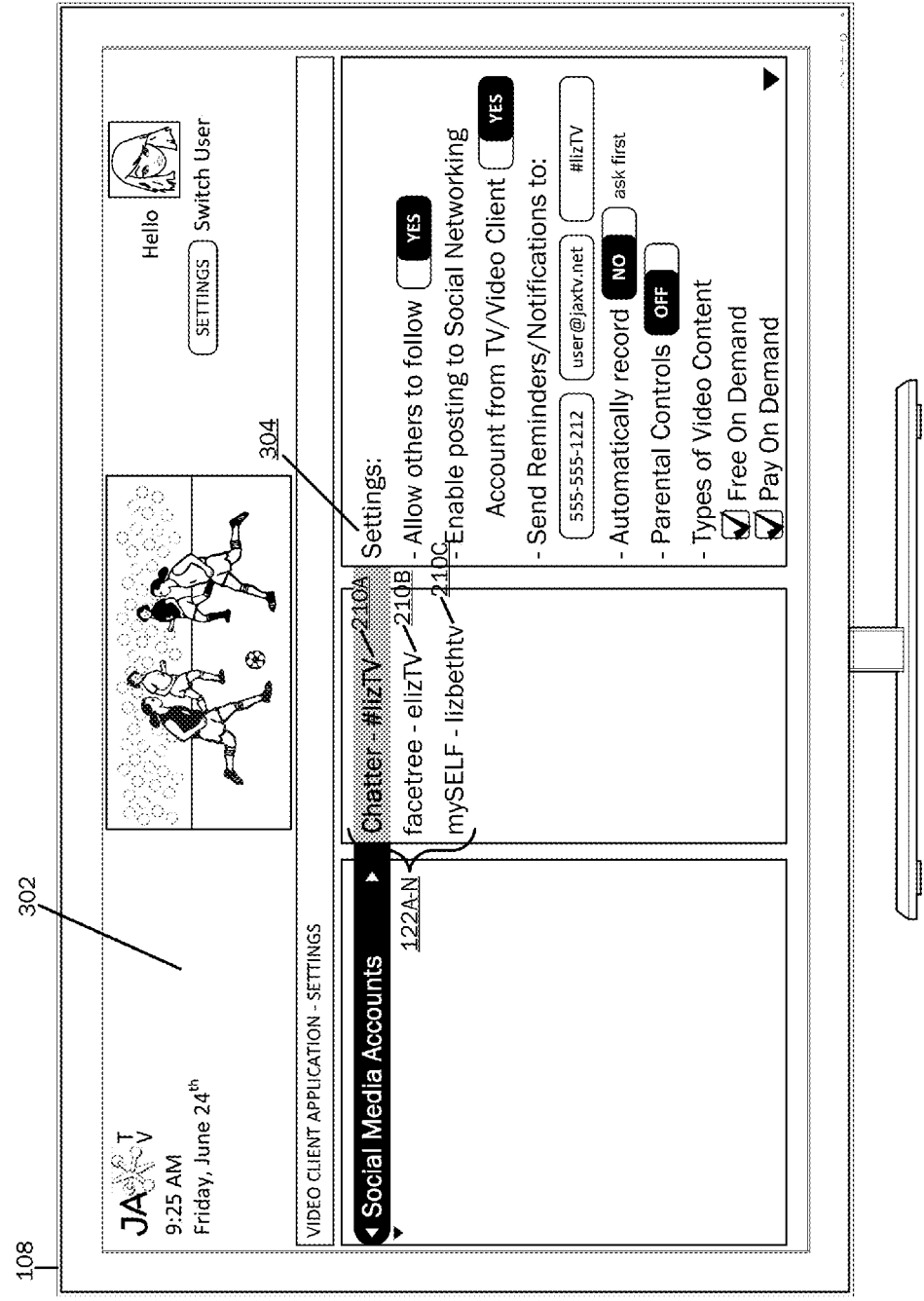
FIG. 3 illustrates an example user interface for linking a social media video client account with a video services subscription account and applying personalized settings for the social media video client account.

With reference now to FIG. 3, one embodiment of an example video client application user interface 302 is illustrated. The user interface 302 may be utilized by a user 104 to create a video client social media account 210 linked to his/her video services subscription account. If a video client social media account 210 is created through a social media service 122 (and not via the client application user interface 302), the user interface 302 may be utilized to link the video client social media account 210 with the user's video services subscription account. Additionally, and as illustrated, the user interface 302 may be utilized to apply various personalized settings 304 to the user's one or more video client social media accounts 210.

Once one or more video client social media accounts 210 are linked to the user's video services subscription account, a listing of the one or more video client social media accounts 210 (and the social media service 122 with which each video client social media account 210 is associated) may be displayed from which the user 104 may select to apply or edit various settings 304. For example, the various settings 304 may include, but are not limited to, a setting for allowing social media friends 128 to follow the video client social media account 210; a setting for enabling posting of video content information to the video client social media account 210 profile space (which other people may be able to see); a setting for entering one or more contact numbers, addresses, or social media service 122 profile names to which to send reminders/notifications 206; a setting for allowing/disallowing automatic recording of video content items 202 when they are available; a setting for allowing automatic recording of a video content item 202 when it receives a user-selectable number of "likes" from social media friends 128; a setting to place video content items 202 in a folder 212; a setting for turning on/off parental controls; a setting for selecting which types of video content items 202 to search (e.g., free content, pay content, linear content, on demand content, etc.); etc.

Figure 4:
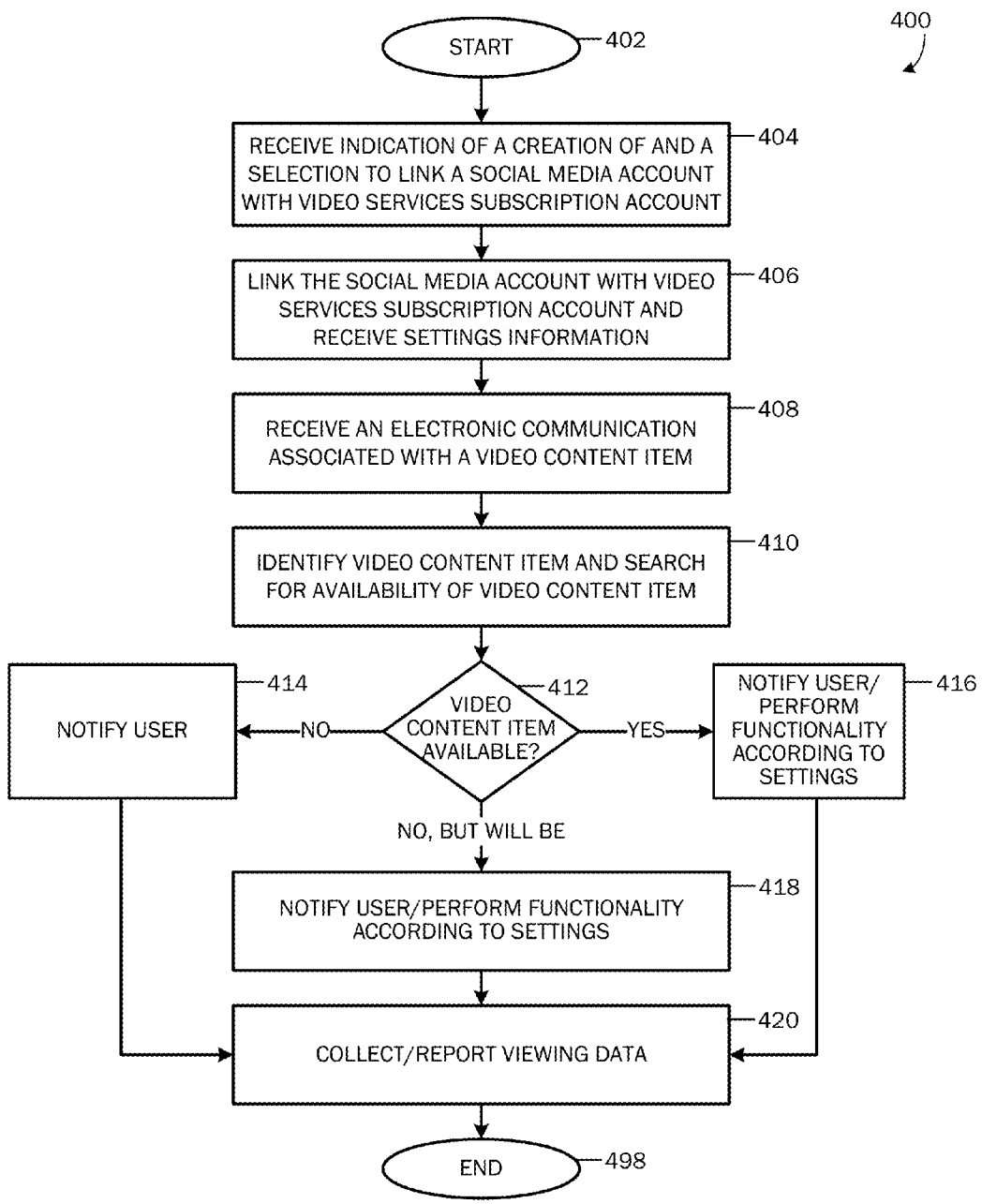
FIG. 4 is a flow chart of one embodiment of a method for linking a video client social media account with a video services subscription account.

With reference now to FIG. 4, a flowchart of one embodiment of a method 400 for creating a video client social media account 210 and linking the video client social media account 210 with a video services subscription account. The method 400 starts at OPERATION 402, and proceeds to OPERATION 404 where an indication of creation of and a selection to link a video client social media account 210 with a video services subscription account is received. As described above, the video client social media account 210 may be created via a social media service 122, or may be created via the video client application user interface 302. If the video client social media account 210 is created via a social media service 122, a selection to link the video client social media account 210 with the video services subscription account, the user 104 may be prompted to finalize the account creation process through the video client application 110. Accordingly, the user 104 may utilize the video client application user interface 302 to select to link the video client social media account 210 with the video services subscription account.

The method 400 proceeds to OPERATION 406, where the video client social media account 210 may be linked with the user's video service subscriber account and stored in the service provider back end/application server 124. A same username and password may be used to access the video client social media account 210 and the user's video service subscriber account. Additionally, the user's video service subscriber account may comprise information, such as preferences, privacy settings, and other settings that may be applied to the linked video client social media account 210. As described above, according to an embodiment, one or more client devices 106 on which the user may access video content (and which may be specified by IP address or by name for the particular device) may be registered to the user's video service subscriber account. If one or more client devices 106 are registered to the user's video service subscriber account, the registered device(s) 106 may be linked to the user's video client social media account 210. Various settings 304 may be selectively applied to the video client social media account 210, for example, via the video client application user interface 302 as described above with reference to FIG. 3.

The method 400 may proceed to OPERATION 408, where an electronic communication associated with a video content item 202 or a series or grouping of video content items is received. For example, the user 104 may follow a video content item 202, like a video content item 202, search for a video content item 202, post an image of a video content item 202, receive an indication of a social media friend 128 following or liking a video content item 202, etc. via the video client social media account 210. As another example, the user 104 may send a text, email, microblog, etc., including data associated with a video content item 202 (e.g., title, key words, image, sound clip, other metadata video content metadata, etc.) to the video client social media account 210.

At OPERATION 410, the video content item 202 may be identified. For example, if the communication of the video content item 202 is a sound clip from a video content item 202, the sound clip may be analyzed, and the video content item 202 may be recognized. Availability of the identified video content item(s) 202 may be searched according to default settings or settings 304 made by the user 104 for the video client social media account 210. For example, a user 104 may select to only search for free content. Accordingly, the availability of free video content items 202 matching the received data may be searched.

The method 400 may proceed to DECISION OPERATION 412, where a determination may be made as to the availability of the identified video content item(s) 202. If the identified video content item(s) 202 is/are not available, the method 400 may proceed to OPERATION 414, where a notification 206 that no video content item(s) 202 matching the received information is/are available may be sent to the user 104 via or more various electronic communication methods.

If a determination is made that the identified video content item(s) 202 is/are available at DECISION OPERATION 412, the method 400 may proceed to OPERATION 416, where a notification 206 of the availability of the video content item(s) 202 may be sent to the user 104 via one or more various electronic communication methods and one or more functionalities may be performed according to default settings or settings 304 made by the user 104 for the video client social media account 210. For example, the video content item(s) 202 may be recorded, placed in a folder 212, posted or microblogged to the video client social media account 210, etc.

If, at DECISION OPERATION 412, a determination is made that the identified video content item(s) 202 is/are not currently available but is scheduled to be available in the future, the method 400 may proceed to OPERATION 418, where a notification 206 of the coming-availability of the video content item(s) 202 may be sent to the user 104 via or more various electronic communication methods and one or more functionalities may be performed according to default settings or settings 304 made by the user 104 for the video client social media account 210. For example, the video content item(s) 202 may be recorded, placed in a folder 212, posted or microblogged to the video client social media account 210, and/or a reminder/notification 206 may be sent when the video content item(s) 202 become(s) available, etc.

The method 400 may proceed from OPERATIONS 414, 416, or 418 to OPERATION 420, where viewing and interaction information may be collected and sent to the service provider back end/application server 124. The information may be analyzed and utilized for understanding where the user 104 is finding information about what he/she likes to watch and to understand the viewing preferences of the user 104. The information may further be utilized to feed to a recommendation engine to provide the user 104 with better recommendations and to provide the user 104 with targeted advertisements related to what the user 104 likes. The method 400 ends at OPERATION 498.

Figure 5:
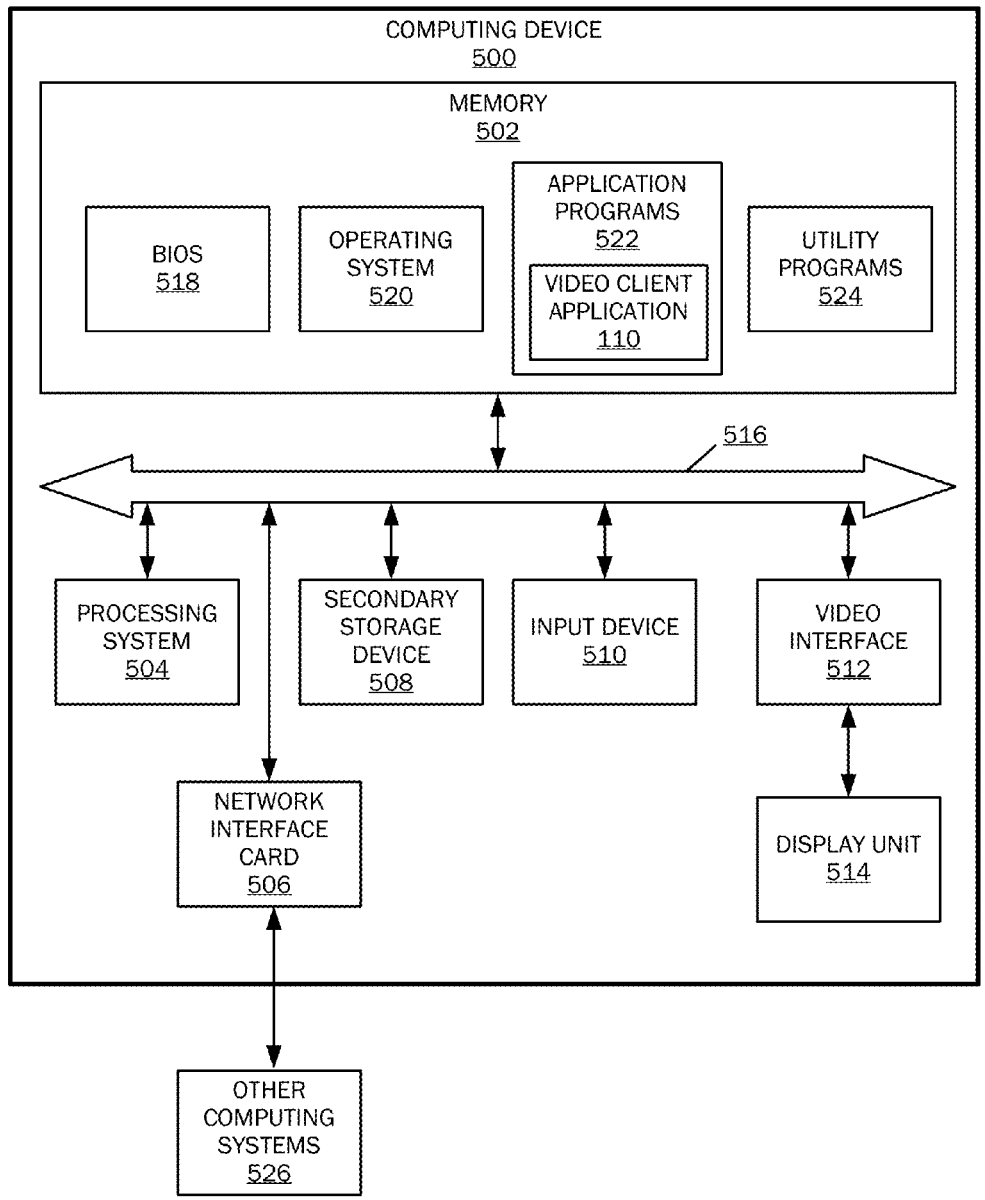
FIG. 5 is a block diagram illustrating example physical components of a computing device with which embodiments may be practiced.

FIG. 5 is a block diagram illustrating example physical components of a computing device 500 with which embodiments may be practiced. In some embodiments, one or a combination of the components of the system 100 may be implemented using one or more computing devices like the computing device 500. It should be appreciated that in other embodiments, one or a combination of the components of the 100 may be implemented using computing devices having hardware components other than those illustrated in the example of FIG. 5.

Computing devices may be implemented in different ways in different embodiments. For instance, in the example of FIG. 5, the computing device includes a processing system 504, memory 502, a network interface 506, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules. The memory 502 includes one or more computer-readable storage media capable of storing data and/or computer-executable instructions. According to an embodiment, the service provider video application 110 may be stored locally on computing device 500. Memory 502 thus may store the computer-executable instructions that, when executed by processor 504, provide video client social media account creation and linking as described herein.

In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other systems 526, such as over a wireless network in a distributed computing environment, a satellite link, a cellular link, and comparable mechanisms. Other devices may include computer system(s) 526 that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, keypads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users, for example, the video client application 110. The memory 502 also stores one or more utility programs 524 that, when executed by the processing system 504, cause the computing device 500 to provide utilities to other software programs. Embodiments of the present invention may be utilized in various distributed computing environments where tasks are performed by remote processing devices that are linked through a communications network in a distributed computing environment.

Figure 6:
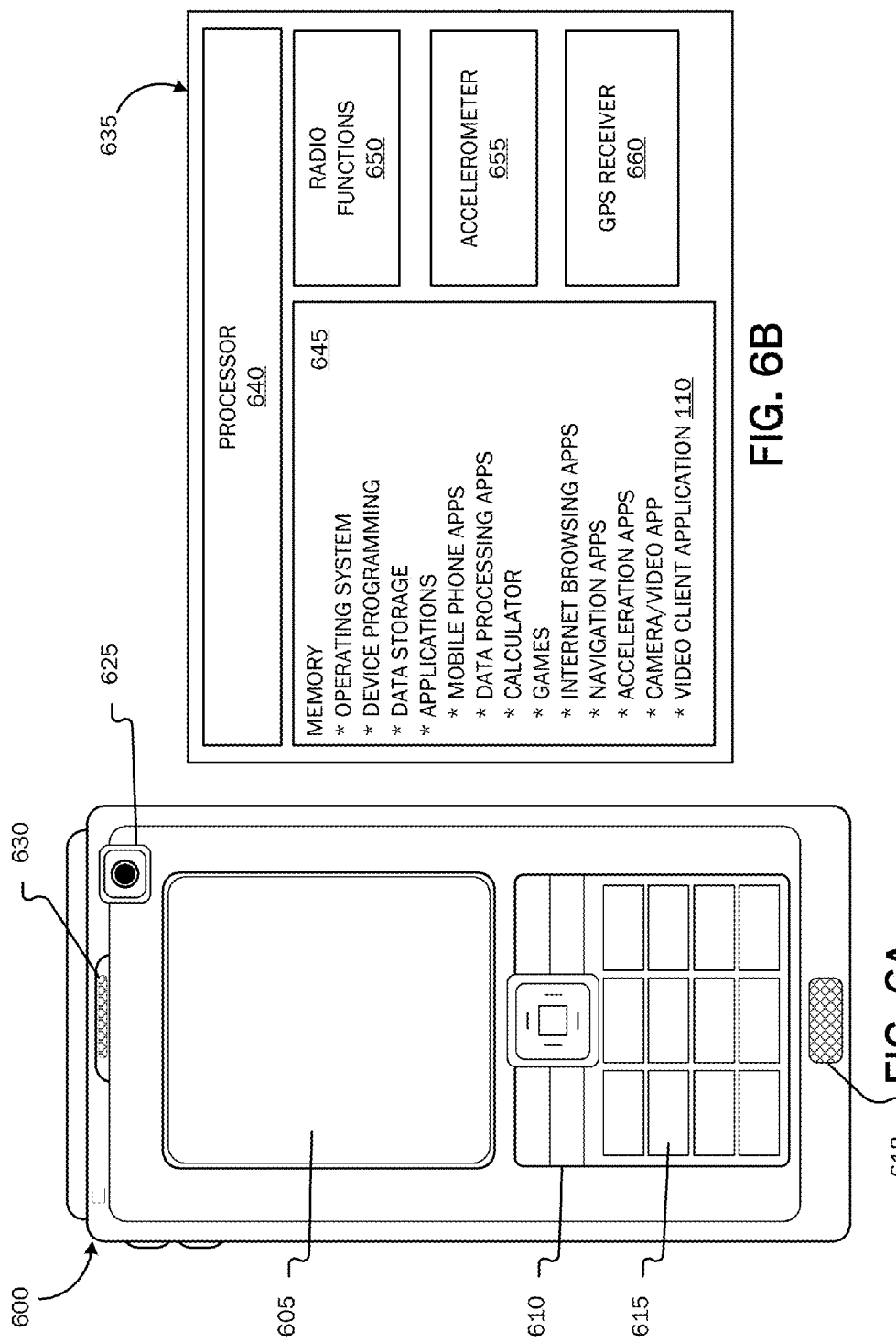
FIGS. 6A-6B illustrate a suitable mobile computing environment with which embodiments may be practiced.

FIGS. 6A-6B illustrate a suitable mobile computing environment, for example, a mobile computing device 600 embodied as a mobile phone 106D, a tablet personal computer 106B, a laptop computer 106C, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the device 600 may be performed via a variety of suitable means, such as, touch screen input via the display screen 605, keyboard or keypad input via a data entry area 610, key input via one or more selectable buttons or controls 615, voice input via a microphone 618 disposed on the device 600, photographic input via a camera 625 functionality associated with the mobile computing device, or any other suitable input means. Data may be output via the device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, the service provider video client application 110, calculators, games, Internet browsing applications, navigation applications, acceleration applications, camera and/or video applications, etc.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the device 600 to communicate with other communication devices and systems via a wireless network. Radio functions 650 may be utilized to communicate with a wireless or WIFI-based positioning system to determine a device's 600 location.

Figure 7:
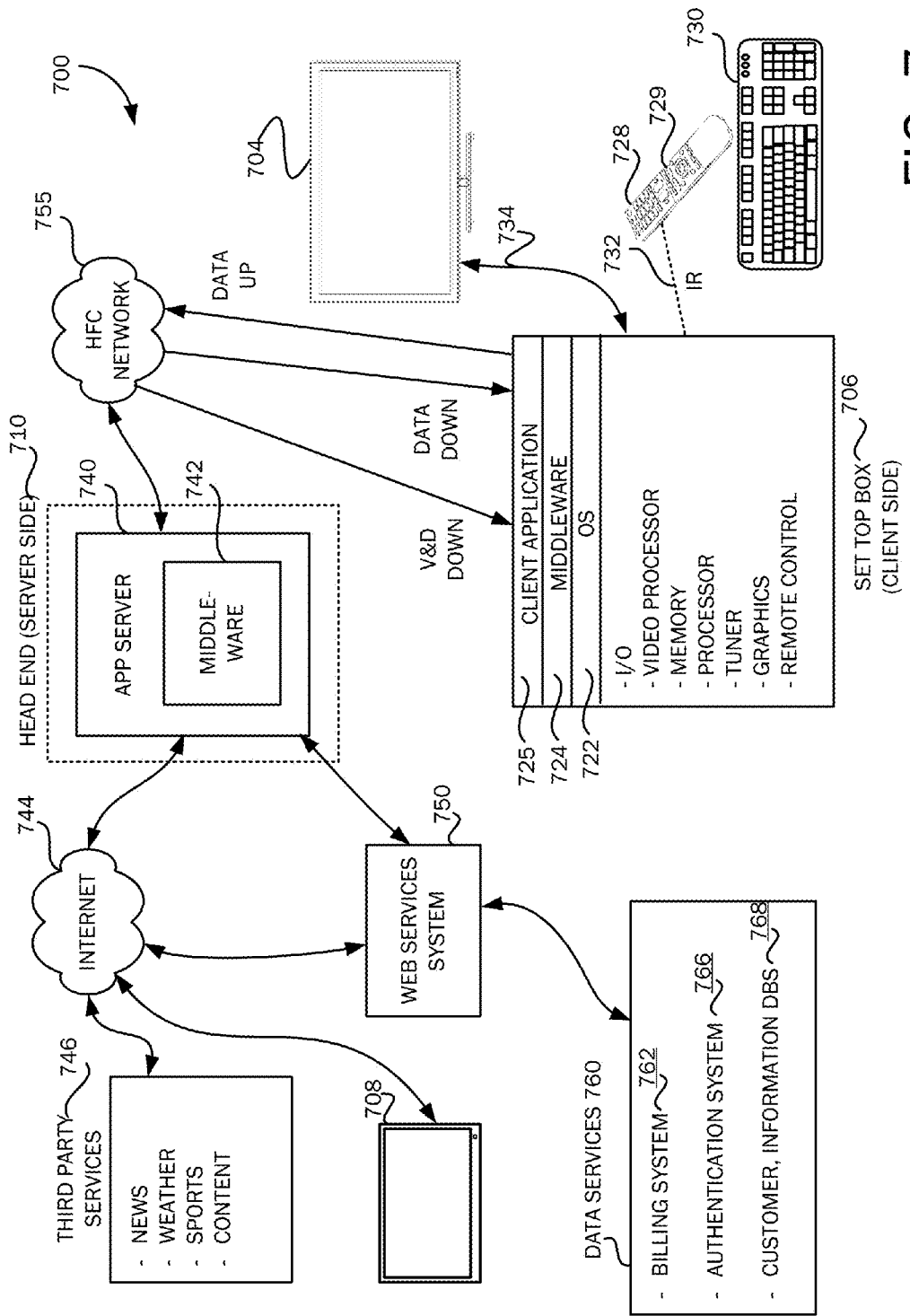
FIG. 7 is a simplified block diagram illustrating one embodiment of a cable television services system providing video client social media account creation and linking of the video client social media account creation to a video services subscription account.

FIG. 7 is a simplified block diagram illustrating one embodiment of a cable television services system providing video client social media account creation and linking functionality. As can be appreciated, a cable television services system (CATV) 700 is but one of various types of systems that may be utilized to provide the functionality described herein. Digital and analog video programming, information content and interactive television services are provided via a hybrid fiber-coax (HFC) network 755 to a television set 704 for consumption by a cable television/services system customer. As is known to those skilled in the art, HFC networks 755 combine both optical fiber and coaxial cable lines. Typically, optical fiber runs from the cable headend 710 to neighborhoods of subscribers. Coaxial cable runs from the optical fiber feeders to each customer or subscriber. The functionality of the HFC network 755 allows for efficient bidirectional data flow between the client-side set-top box 706 and a server-side application server 740.

The CATV system 700 is in the form of a distributed client-server computing system for providing video and data flow across the HFC network 755 between server-side services providers (e.g., cable television/services providers) via a server-side headend 710 and a client-side customer via a client-side set-top box (STB) 706 functionally connected to a customer receiving device, such as the television set 704. As is understood by those skilled in the art, CATV systems 700 may provide a variety of services across the HFC network 755 including digital and analog video programming, telephone services, high speed Internet access, video-on-demand, and information services.

On the client side of the CATV system 700, digital and analog video programming and digital and analog data are provided to the customer television set 704 via the STB 706. Interactive television services that allow a customer to input data to the CATV system 700 likewise are provided by the STB 706. As illustrated in FIG. 7, the STB 706 is a multipurpose computing device having a computer processor, memory, and an input/output mechanism. The input/output mechanism receives input from server-side processes via the HFC network 755 and from customers via input devices such as the remote control device 728, keyboard 730, or other computing device, such as a tablet/slate computer, smart phone, etc. The remote control device 728 and the keyboard 730 may communicate with the STB 706 via a suitable communication transport such as the infrared connection 732. The STB 706 also includes a video processor for processing and providing digital and analog video signaling to the television set 704 via a cable communication transport 734. A multi-channel tuner is provided for processing video and data to and from the STB 706 and the server-side headend system 710, described below.

The STB 706 also includes an operating system 722 for directing the functions of the STB 706 in conjunction with a variety of client applications 725, for example, service provider video client application 110. For example, if a client application 725 requires a news flash from a third-party news source to be displayed on the television 704, the operating system 722 may cause the graphics functionality and video processor of the STB 706, for example, to output the news flash to the television 704 at the direction of the client application 725 responsible for displaying news items.

Because a variety of different operating systems 722 may be utilized by a variety of different brands and types of set-top boxes, a middleware layer 724 may be provided to allow a given software application to be executed by a variety of different operating systems. According to an embodiment, the middleware layer 724 may include a set of application programming interfaces (APIs) that are exposed to client applications 725 and operating systems 722 that allow the client applications to communicate with the operating systems through common data calls understood via the API set. As described below, a corresponding middleware layer is included on the server side of the CATV system 700 for facilitating communication between the server-side application server and the client-side STB 706. The middleware layer 742 of the server-side application server and the middleware layer 724 of the client-side STB 706 may format data passed between the client side and server side according to the Extensible Markup Language (XML).

According to one embodiment, the set-top box 706 passes digital and analog video and data signaling to the television 704 via a one-way communication transport 734. According to other embodiments, two-way communication transports may be utilized, for example, via high definition multimedia (HDMI) ports. The STB 706 may receive video and data from the server side of the CATV system 700 via the HFC network 755 through a video/data downlink and data via a data downlink. The STB 706 may transmit data from the client side of the CATV system 700 to the server side of the CATV system 700 via the HFC network 755 via one data uplink. The video/data downlink is an in-band downlink that allows for digital and analog video and data signaling from the server side of the CATV system 700 through the HFC network 755 to the set-top box 706 for use by the STB 706 and for distribution to the television set 704. The in-band signaling space operates in a specified frequency divided into channels. Each channel carries one or more signals, such as a single analog signal or multiple digital signals.

The data downlink and the data uplink, illustrated in FIG. 7, between the HFC network 755 and the set-top box 706 comprise out-of-band data links. The out-of-band frequency range is generally lower than the in-band signaling frequency range. Data flow between the client-side set-top box 706 and the server-side application server 740 is typically passed through the out-of-band data links. Alternatively, an in-band data carousel may be positioned in an in-band channel into which a data feed may be processed from the server-side application server 740 through the HFC network 755 to the client-side STB 706. Operation of data transport between components of the CATV system 700 is well known to those skilled in the art.

The headend 710 of the CATV system 700 is positioned on the server side of the CATV system and includes hardware and software systems responsible for originating and managing content for distributing through the HFC network 755 to client-side STBs 706 for presentation to customers via televisions 704. As described above, a number of services may be provided by the CATV system 700, including digital and analog video programming, interactive television services, telephone services, video-on-demand services, targeted advertising, and provision of information content.

The application server 740 is a computing system operative to assemble and manage data sent to and received from the client-side set-top box 706 via the HFC network 755. As described above with reference to the set-top box 706, the application server 740 includes a middleware layer 742 for processing and preparing data from the headend of the CATV system 700 for receipt and use by the client-side set-top box 706. For example, the application server 740 via the middleware layer 742 may obtain data, such as content or content metadata, from third-party services 746 via the Internet 744 for transmitting to a customer through the HFC network 755 and the set-top box 706. When the application server 740 receives the downloaded content metadata, the middleware layer 742 may be utilized to format the content metadata for receipt and use by the set-top box 706. Therefore, content metadata may be sent and categorized based on the availability to the customer's program guide data. Similarly, content (e.g., Internet television content and other internet protocol video-based content) may be displayed to the customer on the user's client device 704,708.

According to one embodiment, data obtained and managed by the middleware layer 742 of the application server 740 is formatted according to the Extensible Markup Language and is passed to the set-top box 706 through the HFC network 755 where the XML-formatted data may be utilized by a client application 725 in concert with the middleware layer 724, as described above. As should be appreciated by those skilled in the art, a variety of third-party services data, including news data, weather data, sports data and other information content may be obtained by the application server 740 via distributed computing environments such as the Internet 744 for provision to customers via the HFC network 755 and the set-top box 706.

According to embodiments, the application server 740 obtains customer support services data, including billing data, information on customer work order status, answers to frequently asked questions, services provider contact information, and the like from data services 760 for provision to the customer via an interactive television session. In the illustrated embodiment, the services provider data services 760 include a number of services operated by the services provider of the CATV system 700 which may include data on a given customer.

A billing system 762 may include information such as a customer's name, street address, business identification number, Social Security number, credit history, and information regarding services and products subscribed to by the customer. According to embodiments, the billing system 762 may also include billing data for services and products subscribed to by the customer for bill processing, billing presentment and payment receipt.

A customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. As should be understood, this information may be stored in a variety of disparate databases operated by the cable services provider.

A web services system 750 serves as a collection point for data requested from each of the disparate data services systems comprising the data services 760. According to embodiments, when the application server 740 requires customer services data from one or more of the data services 760, the application server 740 passes a data query to the web services system 750. The web services system formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above.

An authentication system 766 may include information such as secure user names, subscriber profiles, subscriber IDs, and passwords utilized by customers for access to network services. As should be understood by those skilled in the art, the disparate systems 762, 766, 768 may be integrated or provided in any combination of separate systems, wherein FIG. 7 shows only one example.

Embodiments the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to the Figures. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method comprising:
    receiving an indication from a video client application of a selection to link a social media account with a subscription account associated with a service provider system that provides television services;
    linking the social media account with the subscription account such that communications via the social media account are communicated to the video client application and communications via the video client application are communicated to the social media account;
    receiving an electronic communication comprising video content information;
    identifying at least one video content item associated with the received video content information;
    performing a search across content sources associated with the subscription account for the at least one video content item including upcoming video content based on the received video content information;
    determining an availability of the at least one video content item including the upcoming video content; and
    providing a notification of the determined availability of the at least one video content item including referencing the determined availability of the upcoming video content on the social media account.

2. The method of claim 1, further comprising receiving settings information, wherein the settings information is utilized for determining one or more functionalities associated with the at least one video content item to perform.

3. The method of claim 2, wherein if a video content item of the at least one video content item is currently available, performing one or more functionalities associated with the video content item, the one or more functionalities comprising:
    recording the video content item;
    placing the video content item in a folder;
    posting a notification of the current availability of the video content item on a profile page of the social media account; and
    providing a microblogging message to the social media account.

4. The method of claim 2, wherein if a video content item of the at least one video content item is not currently available but is scheduled to be available, performing one or more functionalities associated with the video content item when the video content item is available, the one or more functionalities comprising:
    recording the video content item;
    placing the video content item in a folder;
    posting a notification of the current availability of the video content item on a profile page of the social media account; and
    providing a microblogging message to the social media account.

5. The method of claim 1, wherein receiving an electronic communication comprising video content information comprises receiving one of:

an indication of following a video content item via the social media account;

an indication of liking a video content item via the social media account;

an indication of a search for a video content item via the social media account;

an indication of a posting of an image, audio clip, or a video clip of a video content item to the social media account; or a text message, email, or microblog comprising a video content item title, video content item image, video content item audio clip, video content item video clip, or video content item metadata.

6. The method of claim 1, wherein providing a notification of the determined availability of the at least one video content item comprises providing at least one of:

a text message;
an email message;
a microblog; and
a social media account posting.

7. The method of claim 1, further comprising:

collecting video content interaction and viewing data; and
analyzing the collected data for determining user preferences and from where a user is finding information about what the user likes to watch.

8. A system comprising:

a memory storage; and one or more processors coupled to the memory storage, wherein the one or more processors are operable to:

receive an indication from a video client application of a selection to link a social media account with a subscription account associated with a service provider system that provides television services;

link the social media account with the subscription account such that communications via the social media account are communicated to the video client application and communications via the video client application are communicated to the social media account;

receive an electronic communication comprising video content information;

identify at least one video content item associated with the received video content information;

perform a search across content sources associated with the subscription account for the at least one video content item including upcoming video content based on the received video content information;

determine an availability of the at least one video content item including the upcoming video content; and provide a notification of the determined availability of the at least one video content item including referencing the determined availability of the upcoming video content on the social media account.

9. The system of claim 8, wherein the one or more processors are further operable to receive settings information, wherein the settings information is utilized for determining one or more functionalities associated with the at least one video content item to perform.

10. The system of claim 9, wherein if a video content item of the at least one video content item is currently available, the one or more processors are further operable to perform one or more functionalities associated with the video content item, the one or more functionalities comprising:

recording the video content item;
placing the video content item in a folder;

posting a notification of the current availability of the video content item on a profile page of the social media account; and providing a microblogging message to the social media account.

11. The system of claim 9, wherein if a video content item of the at least one video content item is not currently available but is scheduled to be available, the one or more processors are further operable to perform one or more functionalities associated with the video content item when the video content item is available, the one or more functionalities comprising:

recording the video content item;
placing the video content item in a folder;

posting a notification of the current availability of the video content item on a profile page of the social media account; and providing a microblogging message to the social media account.

12. The system of claim 8, wherein in receiving an electronic communication comprising video content information, the one or more processors are operable to receive one of:

an indication of following a video content item via the social media account;

an indication of liking a video content item via the social media account;

an indication of a search for a video content item via the social media account;

an indication of a posting of an image, audio clip, or a video clip of a video content item to the social media account; or a text message, email, or microblog comprising a video content item title, video content item image, video content item audio clip, video content item video clip, or video content item metadata.

13. The system of claim 8, wherein in providing a notification of the determined availability of the at least one video content item, the one or more processors are operable to provide at least one of:

a text message;
an email message;
a microblog; and
a social media account posting.

14. The system of claim 8, wherein the one or more processors are further operable to:

collect video content interaction and viewing data; and
analyze the collected data for determining user preferences and from where a user is finding information about what the user likes to watch.

15. A computer readable medium comprising computer executable instructions which, when executed by a computer, perform a method comprising:

receiving an indication from a video client application of a selection to link a social media account with a subscription account associated with a service provider system that provides television services;

linking the social media account with the subscription account such that communications via the social media account are communicated to the video client application and communications via the video client application are communicated to the social media account;

receiving an electronic communication comprising video content information;

identifying at least one video content item associated with the received video content information;

performing a search across content sources associated with the subscription account for the at least one video content item including upcoming video content based on the received video content information;

determining an availability of the at least one video content item including the upcoming video content; and providing a notification of the determined availability of the at least one video content item including referencing the determined availability of the upcoming video content on the social media account.

16. The computer readable medium of claim 15, further comprising receiving settings information, wherein the settings information is utilized for determining one or more functionalities associated with the at least one video content item to perform, the one or more functionalities comprising:

recording the video content item;

placing the video content item in a folder;

posting a notification of the current availability of the video content item on a profile page of the social media account; and providing a microblogging message to the social media account.

17. The computer readable medium of claim 15, wherein if a video content item of the at least one video content item is not available but is scheduled to be available, providing a notification when the video content item is available, the notification comprising one or more of:

a text message;
an email message;
a microblog; and
a social media account posting.

18. The computer readable medium of claim 15, wherein receiving an electronic communication comprising video content information comprises receiving one of:

an indication of following a video content item via the social media account;

an indication of liking a video content item via the social media account;

an indication of a search for a video content item via the social media account;

an indication of a posting of an image, audio clip, or a video clip of a video content item to the social media account; or a text message, email, or microblog comprising a video content item title, video content item image, video content item audio clip, video content item video clip, or video content item metadata.

19. The computer readable medium of claim 15, wherein providing a notification of the determined availability of the at least one video content item comprises providing at least one of:

a text message;
an email message;
a microblog; and
a social media account posting.

20. The computer readable medium of claim 15, further comprising:

collecting video content interaction and viewing data; and analyzing the collected data for determining user preferences and from where a user is finding information about what the user likes to watch.

* * * * *